US009448446B2

(12) United States Patent
Kizu et al.

(10) Patent No.: US 9,448,446 B2
(45) Date of Patent: Sep. 20, 2016

(54) LIQUID CRYSTAL OPTICAL DEVICE, IMAGE DISPLAY DEVICE, AND IMAGING DEVICE

(71) Applicant: KABUSHIKI KAISHA TOSHIBA, Minato-ku (JP)

(72) Inventors: Yuko Kizu, Yokohama (JP); Machiko Ito, Yokohama (JP); Hajime Yamaguchi, Kawasaki (JP); Ayako Takagi, Yokosuka (JP); Shinichi Uehara, Suginami (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 35 days.

(21) Appl. No.: 14/473,271

(22) Filed: Aug. 29, 2014

(65) Prior Publication Data

US 2015/0084945 A1    Mar. 26, 2015

(30) Foreign Application Priority Data

Sep. 20, 2013    (JP) .................................. 2013-196106

(51) Int. Cl.
*G02F 1/1343* (2006.01)
*G02B 27/22* (2006.01)
*G09G 3/00* (2006.01)
*G02F 1/29* (2006.01)
(Continued)

(52) U.S. Cl.
CPC ....... *G02F 1/134309* (2013.01); *G02B 27/225* (2013.01); *G02F 1/29* (2013.01); *G09G 3/003* (2013.01); *H04N 13/0404* (2013.01); *G02F 1/1337* (2013.01); *G02F 1/1395* (2013.01); *G02F 2001/13787* (2013.01); *G09G 2300/0491* (2013.01)

(58) Field of Classification Search
CPC ...... G02F 1/134309; G02F 1/29; G02F 1/13; G02F 1/1337; G02F 1/139; G02F 1/1349; G02F 1/1343; G02F 1/133634; G02F 1/1335; G02F 1/13363; G02B 27/225; G09G 3/003; H04N 13/042
See application file for complete search history.

(56) References Cited

U.S. PATENT DOCUMENTS 7,697,109 B2    4/2010  Yun et al.
8,570,483 B2 *  10/2013 Liu .................. G02F 1/134309
                                                                    349/13
(Continued)

FOREIGN PATENT DOCUMENTS

JP    2007-226231    9/2007
JP    2010-224191    10/2010
(Continued)

*Primary Examiner* — Jonathan Boyd
*Assistant Examiner* — Sardis F Azongha
(74) *Attorney, Agent, or Firm* — Oblon, McClelland, Maier & Neustadt, L.L.P

(57) ABSTRACT

A liquid crystal optical device of an embodiment includes: a first substrate unit; a second substrate unit; and a liquid crystal layer interposed between the first substrate unit and the second substrate unit. The liquid crystal molecules on a side of a first alignment layer of the first substrate unit is aligned perpendicularly to a first principal surface of the first substrate unit while the liquid crystal molecules on a side of a second alignment layer of the second substrate unit are aligned horizontally along a second direction. The opposing electrode includes: a first region and a second region, the first region has N first openings, and the second region includes M second openings, N being an integer of 0 or greater, M being an integer of 1 or greater, M being greater than N.

21 Claims, 11 Drawing Sheets

(51) Int. Cl.
*H04N 13/04* (2006.01)
*G02F 1/1337* (2006.01)
*G02F 1/139* (2006.01)
*G02F 1/137* (2006.01)

(56) References Cited

U.S. PATENT DOCUMENTS

| | | | |
|---|---|---|---|
| 2004/0246423 A1* | 12/2004 | Sasabayashi | G02F 1/133707 349/130 |
| 2006/0244873 A1* | 11/2006 | Nakamura | B82Y 20/00 349/33 |
| 2008/0218459 A1* | 9/2008 | Kim | G02F 1/1323 345/87 |
| 2008/0252720 A1 | 10/2008 | Kim et al. | |
| 2010/0238276 A1 | 9/2010 | Takagi et al. | |
| 2011/0242477 A1* | 10/2011 | Iwamoto | G02F 1/133707 349/158 |
| 2012/0019733 A1 | 1/2012 | Kim et al. | |
| 2012/0293503 A1 | 11/2012 | Miyazawa et al. | |
| 2013/0088680 A1* | 4/2013 | Sakurai | G02F 1/134363 349/141 |
| 2013/0250188 A1* | 9/2013 | Uehara | G02F 1/134309 349/1 |
| 2013/0250223 A1* | 9/2013 | Takagi | G02F 1/134336 349/138 |
| 2014/0118644 A1* | 5/2014 | Liu | G02B 27/2214 349/15 |
| 2014/0198271 A1 | 7/2014 | Kizu et al. | |
| 2014/0240303 A1* | 8/2014 | Chiang | G09G 3/003 345/212 |

FOREIGN PATENT DOCUMENTS

| | | |
|---|---|---|
| JP | 2012-242681 | 12/2012 |
| JP | 2013-195980 | 9/2013 |
| WO | 2013/105240 A1 | 7/2013 |

* cited by examiner

LIQUID CRYSTAL OPTICAL DEVICE, IMAGE DISPLAY DEVICE, AND IMAGING DEVICE

CROSS REFERENCE TO RELATED APPLICATIONS

This application is based upon and claims the benefit of priority from prior Japanese Patent Application No. 2013-196106 filed on Sep. 20, 2013 in Japan, the entire contents of which are incorporated herein by reference.

FIELD

Embodiments described herein relate generally to liquid crystal optical devices, image display devices, and imaging devices.

BACKGROUND

It is known that a liquid crystal optical device is able to vary its refractive index distribution to vary with application of voltages by using the birefringent properties of liquid crystal molecules. There is also a stereoscopic image display device that includes such a liquid crystal optical device and an image display unit.

In such a stereoscopic image display device, the refractive index distribution of the liquid crystal optical device is varied to switch the stereoscopic image display device between a state in which an image displayed on the image display unit is caused to be incident on the eyes of a viewer as is displayed and a state in which an image displayed on the image display unit is caused to be incident on the eyes of the viewer as multiple parallax images. With this arrangement, a high-definition two-dimensional image display operation and a three-dimensional image display operation are realized, where the three-dimensional image display operation includes an autostereoscopic viewing for the naked eyes with the multiple parallax images. The liquid crystal optical device used in the stereoscopic image display device is expected to have a suitable optical properties for comfortable viewing.

DETAILED DESCRIPTION

A liquid crystal optical device according to a first embodiment includes: a first substrate unit including: a first substrate having a first principal surface parallel to a first direction and a second direction perpendicular to the first direction; a plurality of first electrodes formed on the first principal surface, the first electrodes extending in the first direction and being arranged in the second direction; a plurality of second electrodes, each of the second electrodes being formed between two adjacent first electrodes of the first electrodes on the first principal surface, the second electrodes extending in the first direction and being arranged in the second direction; and a first alignment layer covering the first electrodes, the second electrodes, and the first substrate; a second substrate unit including: a second substrate having a second principal surface facing the first principal surface; an opposing electrode formed between the second principal surface and the first substrate unit; and a second alignment layer covering the opposing electrode and the second substrate; and a liquid crystal layer interposed between the first substrate unit and the second substrate unit, the liquid crystal layer containing liquid crystal molecules. The liquid crystal molecules on a side of the first alignment layer is aligned perpendicularly to the first principal surface while the liquid crystal molecules on a side of the second alignment layer are aligned horizontally along the second direction, the opposing electrode includes: a first region located between a first plane and a second plane, the first plane extending along the center of a width of one of the second electrodes in the second direction, the center line being parallel to the first direction, the first plane being perpendicular to the second direction, the second plane extending along a center line of one of the first electrodes adjacent to the second electrode, the second plane being perpendicular to the second direction; and a second region located between the first plane and a third plane extending along the center line of the other one of the first electrodes adjacent to the second electrode, the third plane being perpendicular to the second direction, and the first region has N first openings, and the second region includes M second openings, N being an integer of 0 or greater, M being an integer of 1 or greater, M being greater than N.

The following is a detailed description of embodiments of the present invention, with reference to the accompanying drawings.

It should be understood that the drawings are schematic or conceptual, and the relationship between the thickness and the width of each component, and the ratios in size between components might differ from those in reality. Also, the size and the proportion of the same component might vary among the drawings.

(First Embodiment)

Figure 1:
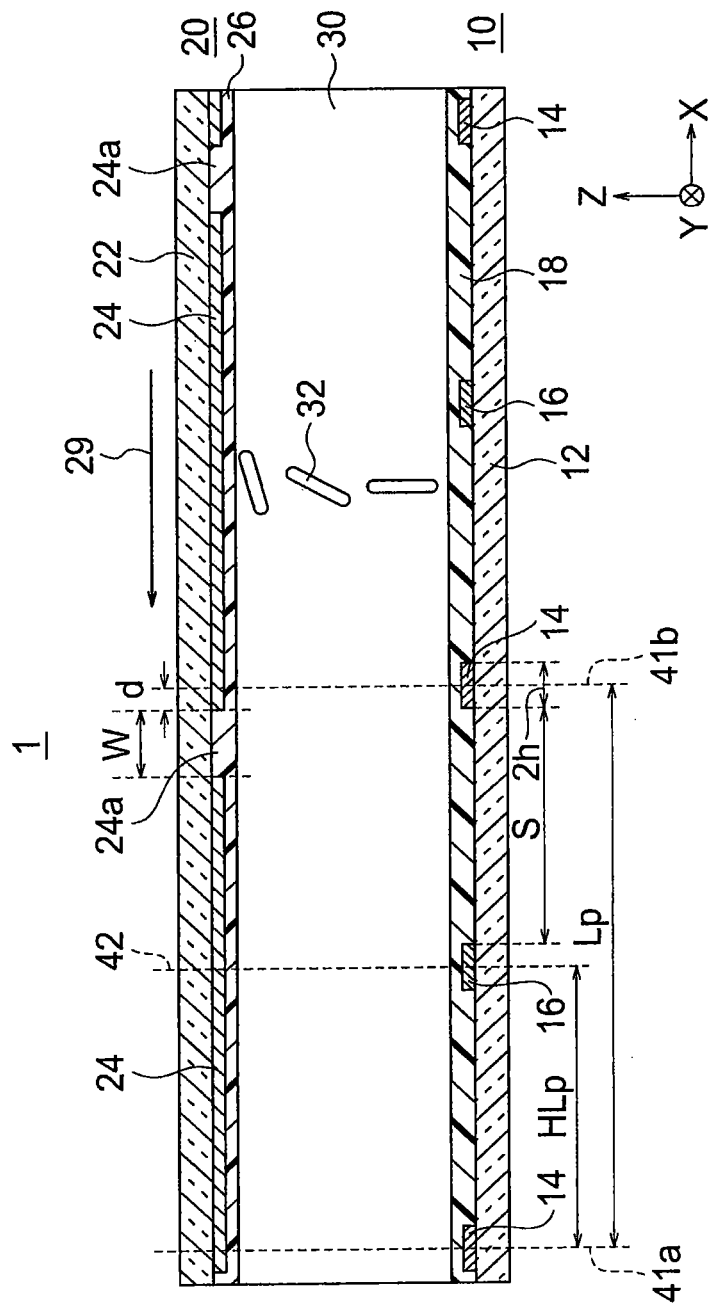
FIG. 1 is a cross-sectional view of a liquid crystal optical device according to a first embodiment.

FIG. 1 shows a liquid crystal optical device according to a first embodiment. FIG. 1 is a cross-sectional view of the liquid crystal optical device of the first embodiment. The liquid crystal optical device of the first embodiment includes a first substrate unit 10, a second substrate unit 20 located on the opposite side from the first substrate unit 10, and a liquid crystal layer 30 interposed between the first substrate unit 10 and the second substrate unit 20.

The first substrate unit 10 includes a first substrate (also referred to as a pattern electrode substrate) 12, first electrodes (also referred to as lens-edge electrodes) 14, second electrodes (also referred to as lens-center electrodes) 16, and a first alignment layer 18.

The first electrodes 14 are formed on a first surface of the first substrate 12 facing the second substrate unit 20. Each of the first electrodes 14 extends in a first direction parallel to the first surface. The direction perpendicular to the first surface is the Z-axis direction, a direction perpendicular to the Z-axis direction is the X-axis direction, and the direction perpendicular to the Z-axis direction and the X-axis direction is the Y-axis direction. For example, the Y-axis direction is the first direction, and the X-axis direction is a second direction. In the description below, the +X-axis direction means the positive direction of the X-axis, and the −X-axis direction means the negative direction of the X-axis. The same applies to the Y-axis direction and the Z-axis direction.

The second electrodes 16 are also formed on the first surface. Each of the second electrodes 16 extends in the first direction (the Y-axis direction) between two adjacent first electrodes 14 among the first electrodes 14. For example, each second electrode 16 is located between one of two adjacent first electrodes 14 and the other one of the two adjacent first electrodes 14. In the example illustrated in FIG. 1, the center of each of the second electrodes 16 is located at the midpoint between two adjacent first electrodes 14. The midpoint between two first electrodes 14 is at the same distance from the center of the width of one of the first two first electrodes as the distance from the center of the width of the other one of the two first electrodes 14 in the X-axis direction. Each of the second electrodes 16 may be located at different distances from the two adjacent first electrodes 14. The distance between each two adjacent first electrodes 14 is constant in the X-axis direction, and this distance is the lens pitch Lp of the liquid crystal optical device 1. This lens pitch Lp is one cycle of the liquid crystal optical device 1. The distance between each two second electrodes 16 is also constant and is equal to Lp. In a case where the lens pitch Lp is a constant value in the entire element, a variation within the range of electrode patterning accuracy is allowed. Also, in the entire element, the lens pitch Lp may be allowed to have a particular distribution. The pattern shape of each of the first electrodes 14 and the pattern shape of each of the second electrodes 14 are band-like shapes, for example.

The second substrate unit 20 includes a second substrate (also referred to as an opposing substrate) 22, an opposing electrode 24, and a second alignment layer 26. The opposing electrode 24 is formed on a second surface of the opposing substrate 22 located on the opposite side from the first substrate unit 10. The opposing electrode 24 has openings 24a that extend in the first direction (the Y-axis direction). A center of one of two adjacent first electrodes 14 in the second direction (the X-axis direction) is a center 41a. A center of the other one of the two adjacent first electrodes 14 in the second direction is a center 41b. A plane that passes through the midpoint of the line segment connecting the center 41a and the center 41b, is a plane 42 (a first plane). The plane 42 is parallel to the Y-Z plane. This plane 42 includes a center line that passes the width center of the second electrode 16 in the X-direction and is parallel to the Y-direction. A second plane denotes a plane that passes through the center 41a and is parallel to the Y-Z plane. A first region denotes a region that is located between the plane 42 and the second plane, and is located on a second principal surface of the opposing electrode 24. A third plane denotes a plane that passes through the center 41b, and is parallel to the Y-Z plane. A second region denotes a region that is located between the plane 42 and the third plane, and is located on the second principal surface of the opposing electrode 24.

In other words, the second plane is a plane that passes through the center line of one of the first electrodes adjacent to a second electrode and is perpendicular to the second direction. The third plane is a plane that passes through the center line of the other one of the first electrodes adjacent to the second electrode and is perpendicular to the second direction.

The first region and the second region differ in the number of openings 24a formed therein. For example, the first region includes N (an integer that is 0 or greater) openings, and the second region includes M (an integer that is 1 or greater, and is greater than N) openings.

In the example illustrated in FIG. 1, the number of openings 24a formed in the first region of the opposing electrode 24 on the left side with respect to the plane 42 is 0, or no openings 24a are formed in the first region. The number of openings 24a formed in the second region of the opposing electrode 24 on the right side is one. The number of openings may be two or more. In the first region or the second region, whichever has the larger number of openings, the distance between the position of the farther end of the opening furthest from the plane 42 and the center 41b of the first electrode 14 closest to the furthest opening is d, the width of each opening 24a is W, the width of each first electrode 14 or the length of each first electrode 14 in the second direction (the X-axis direction) is 2h, and the distance between a first electrode 14 and an adjacent second electrode 16 is S. In other words, S is the distance between the end portion of the first electrode 14 on the side facing the second electrode 16 and the end portion of the second electrode 16 facing the first electrode. In this case, $d \geq h$, and $W \leq S$. In FIG. 1, HLp represents the distance between the centers, of a first electrode 14 and a second electrode 16 that are adjacent to each other in the X-axis direction (the second direction).

The liquid crystal layer 30 is liquid-crystalline medium containing liquid crystal molecules 32. The liquid crystal layer 30 is nematic liquid crystal, for example. The dielectric anisotropy of the liquid crystal layer 30 is positive or negative. In the description below, the liquid crystal layer 30 will be described as nematic liquid crystal having positive dielectric anisotropy.

The first alignment layer 18 is formed between the first electrodes 14 and the liquid crystal layer 30, and between the second electrodes 16 and the liquid crystal layer 30. The first alignment layer 18 perpendicularly aligns liquid crystal molecules. As will be described later, the liquid crystal directors on the side of the first substrate unit 10 may not be strictly perpendicularly-aligned.

The second alignment layer 26 is formed between the opposing electrode 24 and the liquid crystal layer 30. The second alignment layer 26 horizontally aligns liquid crystal molecules. The second alignment layer 26 adjusts the directors (the spatial average of long axes) of liquid crystal molecules 32 to the X-axis direction. That is, the processing (rubbing) direction of the second alignment layer 26 is the negative direction of the X-axis, as indicated by an arrow 29 in FIG. 1. Specifically, in this embodiment, the second alignment layer 26 aligns the liquid crystal molecules 32 on the second alignment layer 26 so that the angle between the directors and the +X-axis direction becomes larger than 90° but not larger than 180° in a state where no voltage is being applied. In this embodiment, the directors of the liquid crystal molecules 32 may not be strictly parallel to the X-axis direction. The absolute difference of the angle between the X-axis and a component formed by projecting a director near the second alignment layer 26 onto the second surface is equal to or smaller than 15°. In a state where the absolute value between the X-axis and the projected component formed on the second surface is equal to or smaller than 15°, the directors of the liquid crystal molecules 32 are defined as to be horizontally-aligned.

In a state where no voltage is being applied between the first electrodes 14 and the opposing electrode 24, and between the second electrodes 16 and the opposing electrode 24 (an inactive state), a HAN (Hybrid Aligned Nematic) orientation is formed in the liquid crystal layer 30. The HAN orientation is a perpendicular orientation on the side of the first substrate unit 10, and is a horizontal orientation on the side of the second substrate unit 20. A first portion of the liquid crystal layer 30 on the side of the first substrate unit 10 has a perpendicular orientation. A second portion of the liquid crystal layer 30 on the side of the second substrate unit 20 has a horizontal orientation. In the horizontal orientation, the directors of the liquid crystal molecules 32 in the range of the above-described state definition are parallel to the X-axis direction.

In the horizontal orientation, the pretilt angle is not smaller than 0° and not larger than 30°. The pretilt angle is the angle between the directors of the liquid crystal molecules 32 near the second alignment layer and the second surface. In the perpendicular orientation, the pretilt angle is not smaller than 60° and not larger than 90°. Where the pretilt angle is smaller than 90°, the orientation axis is parallel to a horizontal side. The orientation axis in this case is the azimuth axis of the projected image formed by projecting a director near the first alignment layer 18 onto the first surface. When the difference in angle between the orientation axes of the horizontal orientation and the perpendicular orientation is within the range of ±1°, the orientation axes are parallel to each other.

The pretilt direction is the direction in which the directors of the liquid crystal molecules 32 tilt with respect to the X-Y plane as the reference plane. The pretilt direction can be determined by a crystal rotation method, for example. Also, the pretilt direction can be determined by changing the orientation of the liquid crystal through application of a voltage to the liquid crystal layer 30, and observing the optical properties of the liquid crystal layer 30.

A transparent material (a material through which visible light passes) is used for each of the first substrate 12, the second substrate 22, the first electrodes 14, the second electrodes 16, and the opposing electrode 24. The first substrate 12 and the second substrate 22 are made of glass or resin, for example. The first electrodes 14, the second electrodes 16, and the opposing electrode 24 are made of a material that contains an oxide containing at least one element selected from the group consisting of In, Sn, Zn, and Ti, for example. The first electrode 14, the second electrode 16, and the opposing electrode 24 may be made of ITO (Indium Tin Oxide), for example. Alternatively, the first electrodes 14, the second electrodes 16, and the opposing electrode 24 may be formed with thin metal layers or graphene, for example.

The first alignment layer 18 and the second alignment layer 26 may be made of polyimide, for example. The material of the first alignment layer 18 differs from the material of the second alignment layer 26. The second alignment layer 26 is made of a material having a larger surface energy than the surface energy of the first alignment layer 18, for example.

Figure 2:
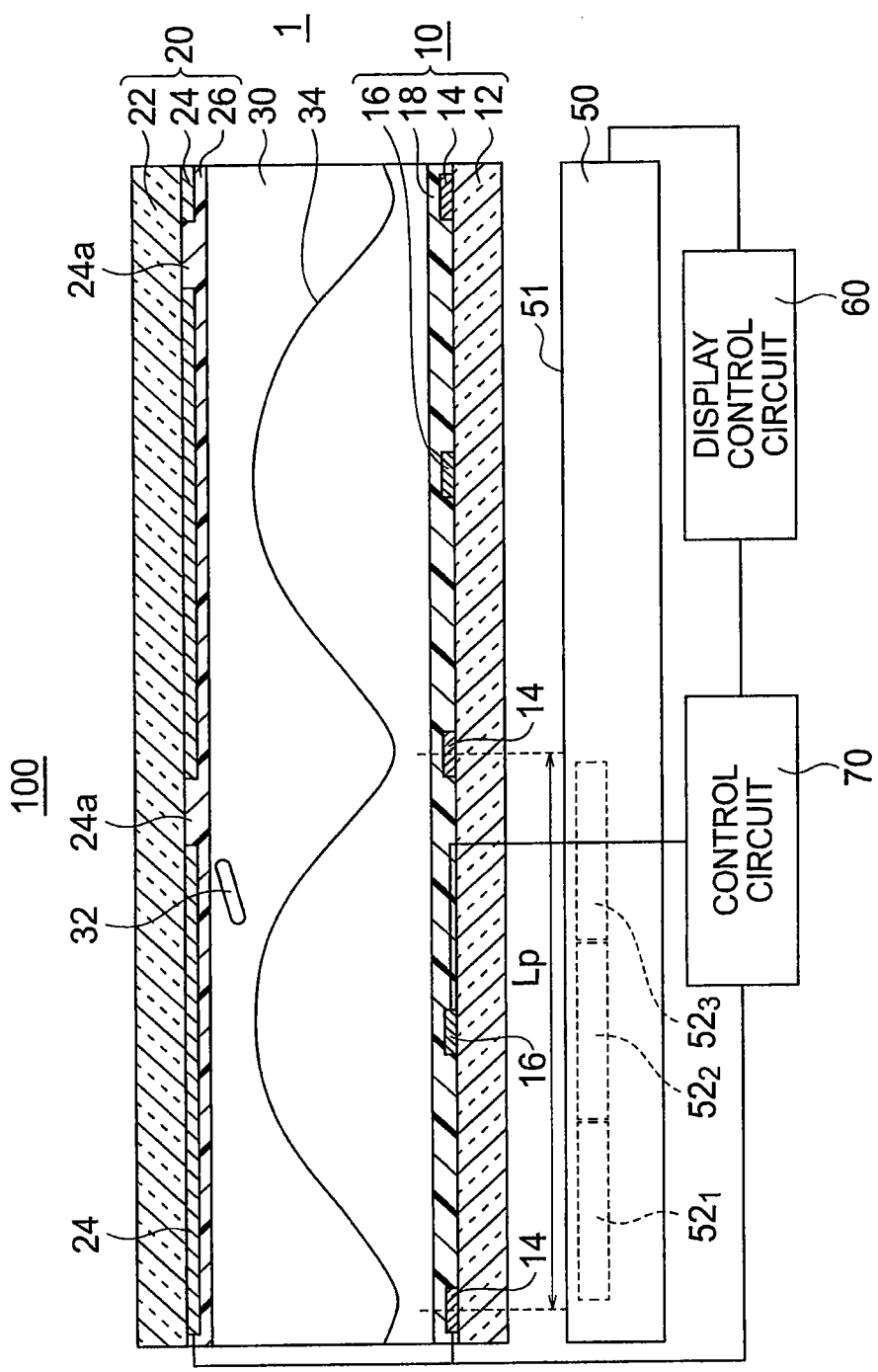
FIG. 2 is a diagram showing a specific example of an image display device using the liquid crystal optical device of the first embodiment.

FIG. 2 shows a specific example of an image device 100 using the liquid crystal optical device 1 according to the first embodiment. The image device 100 of this specific example is an image display device. As shown in FIG. 2, the image display device 100 includes the liquid crystal optical device 1, an image display unit 50, a display control circuit 60, and a control circuit 70 that controls the liquid crystal optical device 1. The image display unit 50 includes pixels. In the image display unit 50 shown in FIG. 2, three pixels $52_1$, $52_2$, and $52_3$ are allocated to each one cycle Lp of the liquid crystal optical device 1.

The image display unit 50 has an image display surface 51 for displaying an image. The image display surface 51 has a rectangular shape, for example. The image display unit 50 is stacked together with the liquid crystal optical device 1. The image display unit 50 and the liquid crystal optical device 1 may be stacked directly on each other. Alternatively, the image display unit 50 and the liquid crystal optical device 1 may be stacked at a distance from each other, or some other component may be inserted between the image display unit 50 and the liquid crystal optical device 1 that are stacked on each other.

The liquid crystal optical device 1 is located in a position that is closer to the viewer than the display surface 51 of the image display unit 50 is. The liquid crystal optical device 1 covers the entire image display surface 51, for example.

The liquid crystal optical device 1 is located so that the first substrate unit 10 faces the image display unit 50, for example.

The display control circuit 60 is electrically connected to the image display unit 50. The control circuit 70 that controls the liquid crystal optical device 1 is electrically connected to the liquid crystal optical device 1 and the display control circuit 60. The display control circuit 60 controls operations of the image display unit 50. For example, a video signal is input to the display control circuit 60 from a recording medium or an external input. The display control circuit 60 then controls the operation of the image display unit 50 based on the input video signal. The image according to the input video signal is displayed on the image display surface 51. The display control circuit 60 may be included in the image display unit 50. The display control circuit 60 may include the control circuit 70.

The control circuit 70 that controls the liquid crystal optical device 1 is electrically connected to the first electrodes 14, the second electrodes 16, and the opposing electrode 24. The control circuit 70 controls the voltages to be applied to the first electrodes 14, the second electrodes 16, and the opposing electrode 24 based on a signal that is supplied from the display control circuit 60. The control circuit 70 supplies the liquid crystal layer 30 with a voltage that forms a refractive index distribution 34 shown in FIG. 2 in the liquid crystal layer 30 of the liquid crystal optical device 1.

The liquid crystal optical device 1 has a refractive index distribution in the X-axis direction (the second direction) in a voltage-applied state, and functions as a liquid crystal GRIN (gradient index) lens, for example. The state of the refractive index distribution 34 of the liquid crystal optical device 1 can be varied by changing the voltages to be applied between the first electrodes 14 and the opposing electrode 24, and between the second electrodes 16 and the opposing electrode 24. One state of the refractive index distribution 34 corresponds to a first state where an image displayed on the image display unit 50 is caused to be incident on the eyes of the viewer as is displayed. Another state of the refractive index distribution 34 corresponds to a second state where an image displayed on the image display unit 50 is multiple parallax images and are then caused to be incident on the eyes of the viewer. The first electrodes 14 can be referred to as the lens-edge electrodes, and the second electrodes 16 can be referred to as the lens-center electrodes.

In the image display device 50, the refractive index distribution of the liquid crystal optical device 1 is varied, to selectively switch between two-dimensional image display (hereinafter referred to as 2D display) and three-dimensional image display (hereinafter referred to as 3D display). In displaying a three-dimensional image, an autostereoscopic view for the naked eye is provided.

The control circuit 70 switches the liquid crystal optical device 1 between the first state and the second state, for example. When 2D display is to be performed in the image display device 100, the control circuit 70 switches the liquid crystal optical device 1 to the first state, and the display control circuit 60 causes the image display unit 50 to display an image for 2D display. When 3D display is to be performed in the image display device 100, the control circuit 70 switches the liquid crystal optical device 1 to the second state, and the display control circuit 60 causes the image display unit 50 to display an image for 3D display.

The image display unit 50 has the rectangular image display surface 51. The image display surface 51 has two sides that are perpendicular to each other. For example, one of the two sides perpendicular to each other is parallel to the X-axis direction shown in FIG. 1, and the other one of the two sides is parallel to the Y-axis direction. The sides of the image display surface 51 may be oriented in any directions perpendicular to the Z-axis direction shown in FIG. 1, for example.

The image display unit 50 includes pixel groups that are arranged in a two-dimensional matrix. The image display surface 51 is formed with those pixel groups. Each pixel group includes the first pixel $52_1$, the second pixel $52_2$, and the third pixel $52_3$. The first through third pixels may be pixels that represent R (red), G (green), and B (blue), respectively, for example. In the description below, the first through third pixels will be also collectively referred to as pixels. Each pixel group is positioned to face a region between two adjacent first electrodes 14. The first, second, and third pixels $52_1$, $52_2$, and $52_3$ included in one pixel group are aligned in the X-axis direction. The number of pixels included in one pixel group is arbitrary.

The image display unit 50 emits light that includes an image to be displayed on the image display surface 51, for example. This light is in a linearly-polarized state where the light travels substantially in the Z-axis direction, for example. The polarizing axis of the linearly polarization, or the azimuth axis of the vibration plane of an electric field in the X-Y plane, extends in the X-axis direction. The polarizing axis of the linear polarization is parallel to the directors (the long axes) of the liquid crystal molecules 32 on the side of the second substrate unit 20. This linear polarization is formed by placing an optical filter (a polarizer) having its polarizing axis in the X-axis direction in the light path, for example.

The lengths of the first electrodes 14 and the second electrodes 16 of the liquid crystal optical device 1 in the Y-axis direction (the first direction) are greater than the length of the image display surface 51 in the Y-axis direction. That is, the first electrodes 14 and the second electrodes 16 cross the image display surface 51 in the Y-axis direction.

In this example, the ends of the first electrodes are connected to a first wiring portion (not shown). The first electrodes 14 and the first wiring portion form a comb-like shape, for example. When a voltage is applied to the first wiring portion, a voltage is applied to the first electrodes 14. The ends of the second electrodes 16 are connected to a second wiring portion (not shown). The second electrodes 16 and the second wiring portion form a comb-like shape. The second wiring portion is located on the opposite side from the first wiring portion. When a voltage is applied to the second wiring portion, a voltage is applied to the second electrodes 16.

The control circuit 70 that controls the liquid crystal optical device 1 controls the potential of the first electrodes 14, the potential of the second electrodes 16, and the potential of the opposing electrode 24. The control circuit 70 controls the voltage between the first electrodes 14 and the opposing electrode 24. The control circuit 70 also controls the voltage between the second electrodes 16 and the opposing electrode 24.

The switching between the first state and the second state in the liquid crystal optical device 1 is performed by applying voltages to (or setting potentials of) the first electrodes 14, the second electrodes 16, and the opposing electrode 24. As shown in FIG. 1, the liquid crystal molecules 32 contained in the liquid crystal layer 30 is perpendicularly-aligned on the side of the first substrate unit 10 and is horizontally-aligned on the side of the second substrate unit 20 in a state where no voltage is being applied to the liquid crystal layer 30 (an inactive state). In this state, the refractive index distribution is substantially constant in the X-axis direction and the Y-axis direction. In a case where no voltage is being applied, the traveling direction of the light including the image displayed on the image display unit 50 does not substantially modulated. When no voltage is being applied, the liquid crystal optical device 1 is in the first state.

When the liquid crystal optical device 1 is in the second state, a voltage is applied to the first electrodes 14, and the second electrodes 16 and the opposing electrode 24 are grounded. That is, the absolute value of the voltage between the first electrodes 14 and the opposing electrode 24 is made greater than the absolute value of the voltage between the second electrodes 16 and the opposing electrode 24. For example, the effective value of the voltage between the first electrodes 14 and the opposing electrode 24 is made greater than the effective value of the voltage between the second electrodes 16 and the opposing electrode 24.

As shown in FIG. 2, in the second state, the refractive index distribution 34 in the liquid crystal layer 30 is modulated in the X-axis direction. In the regions between the first electrodes 14 and the opposing electrode 24, the refractive index is relatively low. In the regions between the second electrodes 16 and the opposing electrode 24, and in the regions in the vicinities of the former regions, the refractive index is relatively high. The refractive index distribution 34 forms a succession of a parabola or a shape similar to a parabola between two adjacent first electrodes 14 (see FIG. 2).

In the first state, a voltage that is so low as not to change the orientation of the liquid crystal molecules 30 may be applied to the first electrodes 14, the second electrodes 16, or the opposing electrode 24.

(Another Example of an Image Device)

Figure 3:
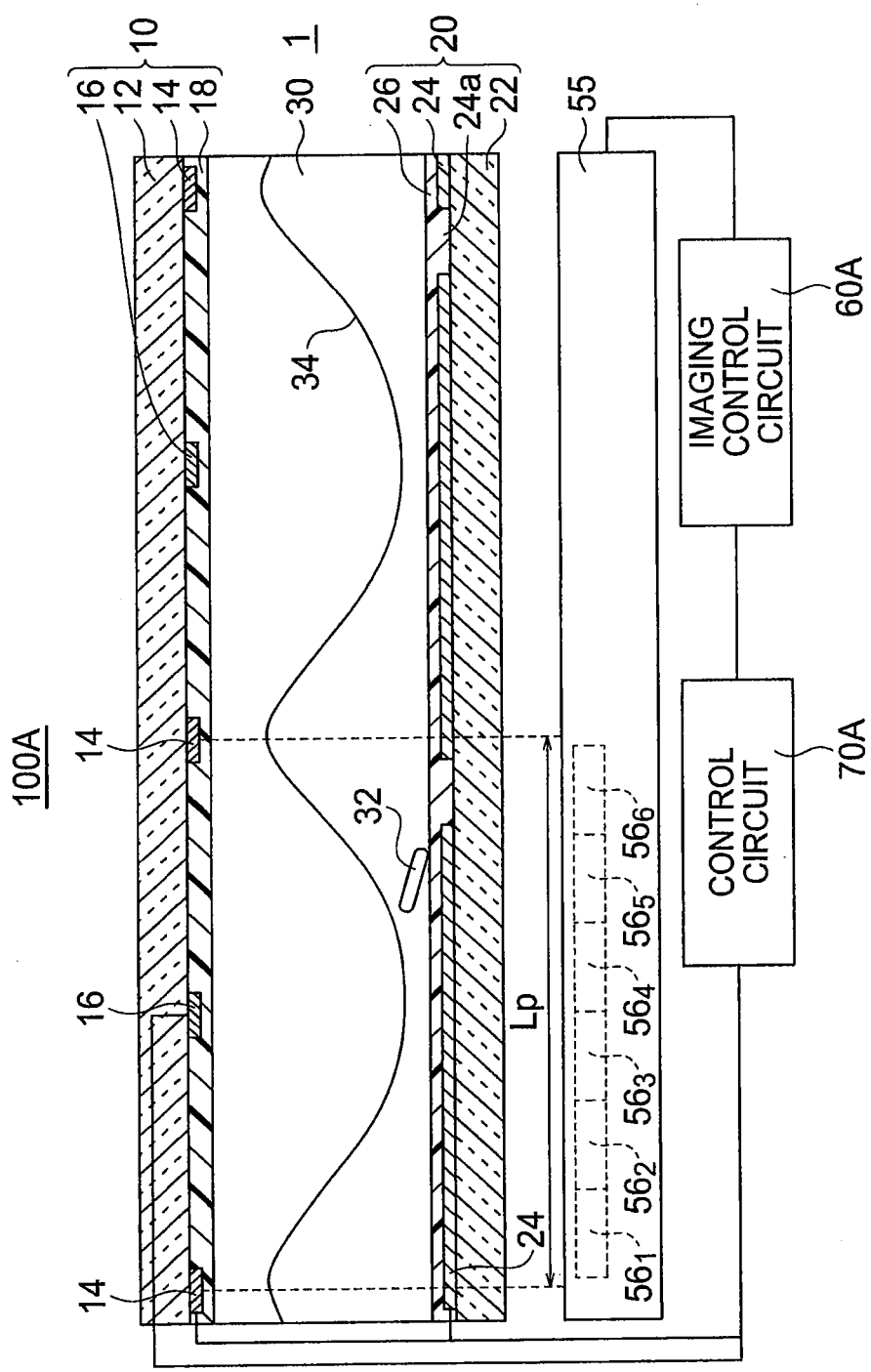
FIG. 3 is a diagram showing a specific example of an imaging device using the liquid crystal optical device of the first embodiment.

FIG. 3 is a cross-sectional view of another specific example of an image device 100A using the liquid crystal optical device 1 of the first embodiment. In this specific example, the image device 100A is an imaging device that includes an imaging unit 55, an imaging control circuit 60A, and a control circuit 70A that controls the liquid crystal optical device 1. The liquid crystal optical device 1 is placed on the light receiving side of the imaging unit 55, and the surface of the liquid crystal optical device 1 serves as the light receiving surface.

The imaging unit 55 includes pixels that convert an optical signal transmitted from an object (not shown) via the liquid crystal optical device 1 into an electric signal. The imaging control circuit 60A drives and controls the imaging unit 55, and obtains an image of the object from the electric signal. The control circuit 70A drives and controls the liquid crystal optical device 1 by applying voltages to the first electrodes 14, the second electrodes 16, and the opposing electrode 24 of the liquid crystal optical device 1 based on the signal from the imaging control circuit 60A.

In the image device 100A of this specific example, the positions of the first substrate unit 10 and the second substrate unit 20 of the liquid crystal optical device 1 are the reverse of those in the image device 100 of the specific example shown in FIG. 2. Specifically, while the first substrate unit 10 is placed on the side of the image display unit 50 of the image device 100 in FIG. 2, the second substrate unit 20 is placed on the side of the imaging unit 55 of the image device 100A of the other specific example in FIG. 3. In this specific example, however, the first substrate unit 10 may be placed on the side of the imaging unit 55 of the image device 100A.

In the image device 100A of the other specific example, the liquid crystal optical device 1 is mounted so that the distance between the liquid crystal optical device 1 and the imaging unit 55 is adjusted so that light is substantially focused on the surface of the imaging unit 55 when a voltage is being applied (in the second state). A main lens unit that is used in a general camera module may be provided on the light receiving side or the side of the liquid crystal optical device 1 opposite from the surface facing the imaging unit 55. In this case, the liquid crystal optical device 1 functions as a microlens array for re-imaging an image formed by the main lens unit in the second state. That is, the image device 100A captures a high-definition still image when the liquid crystal optical device 1 is in the first state, and captures a compound-eye image when the liquid crystal optical device 1 is in the second state. The compound-eye image is reconstructed into an EDOF (extended depth of focus) image and distance information (a depth map) about the object by an image processing unit (not shown).

COMPARATIVE EXAMPLE

Figure 4:
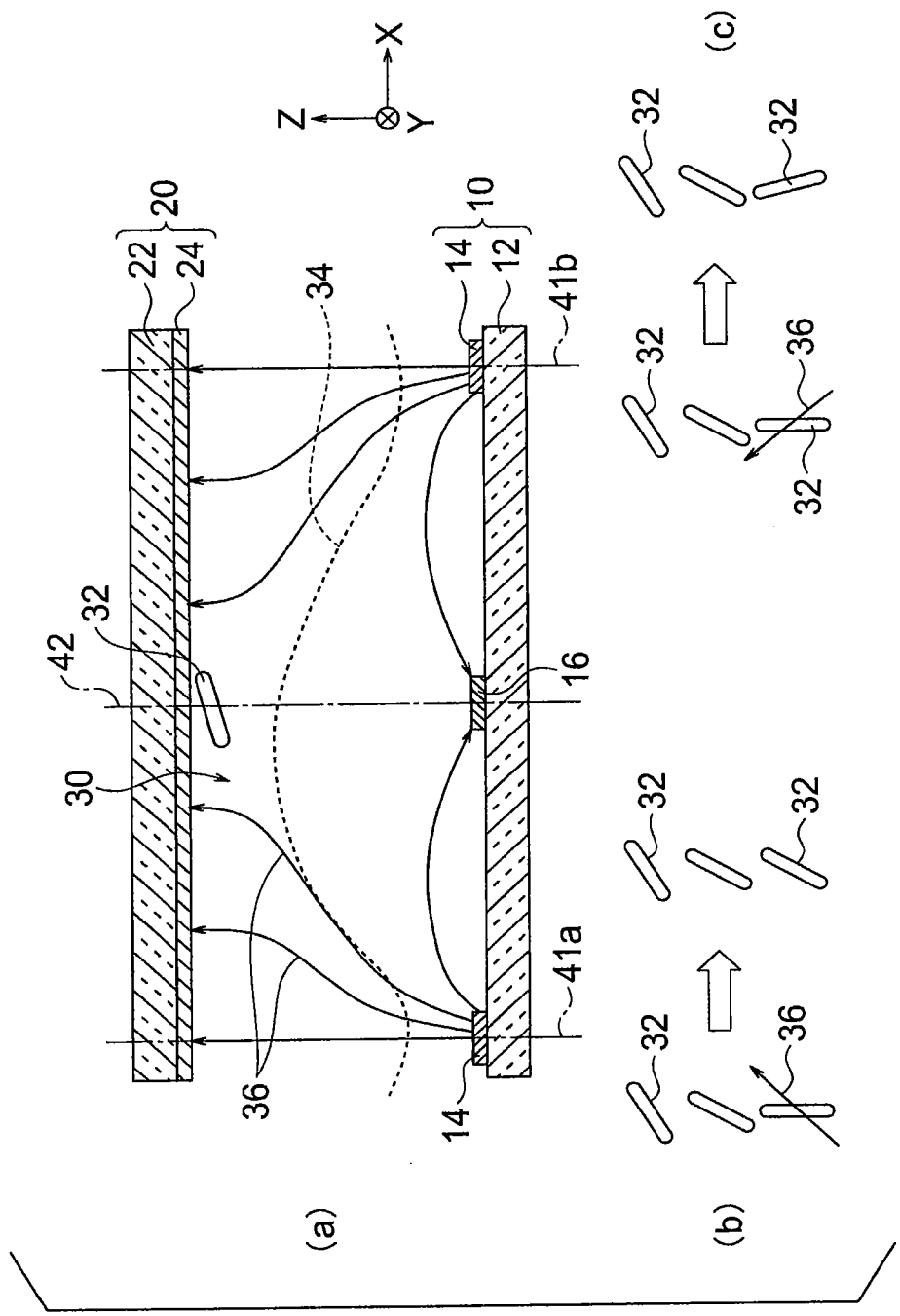
FIGS. 4(a) through 4(c) are diagrams showing a comparative example of a liquid crystal optical device.

Referring now to FIGS. 4(*a*), 4(*b*), and 4(*c*), a liquid crystal optical device according to a comparative example is described. FIG. 4(*a*) is a cross-sectional view of the liquid crystal optical device according to the comparative example. FIGS. 4(*b*) and 4(*c*) are diagrams showing states of liquid crystal molecules 32 in the vicinity of a first electrode (a lens-edge electrode) 14 of the liquid crystal optical device in the comparative example. The liquid crystal optical device in the comparative example differs from the liquid crystal optical device 1 in the first embodiment in that no openings are formed in the opposing electrode 24. Other than the openings, the liquid crystal optical device in the comparative example has the same structure as the liquid crystal optical device 1 in the first embodiment. FIG. 4(*a*) does not show the first alignment layer 18 and the second alignment layer 26 shown in FIG. 1.

As shown in FIG. 4(*a*), when a voltage is applied to each first electrode 14, and each second electrode 16 and the opposing electrode 24 are grounded in the liquid crystal optical device of the comparative example, electric force lines 36 are formed around the first electrodes 14. In a case where the dielectric anisotropy of the liquid crystal layer 30 is positive, the liquid crystal molecules 32 in a dense region of the electric force lines 36 (or a strong electric field region) are reoriented along the paths of the electric force lines 36.

In the regions where the first electrodes 14 face the opposing electrode 24, the liquid crystal molecules 32 that are horizontally-aligned on the side of the second substrate 22 are almost perpendicularly-aligned. In the regions where the second electrodes 16 face the opposing electrode 24, the liquid crystal molecules 32 remain horizontally-aligned. In the region between a first electrode 14 and a second electrode 16, the angles of the liquid crystal molecules 32 vary gradually to perpendicular orientation in the direction from the second electrode 16 toward the first electrode 14. That is, in the Z-X plane, the angles of the directors (spatially averaged long axes) of the liquid crystal molecules 32 vary along the electric force lines 36. The director of the liquid crystal molecules 32 rotate, with the Y-axis direction being the axis of rotation.

The liquid crystal molecules 32 have birefringent properties. The refractive index with respect to polarization in the long-axis direction of the liquid crystal molecules 32 is higher than the refractive index in the short-axis direction of the liquid crystal molecules 32. When the angles of the liquid crystal molecules 32 are modulated as described above, the refractive index of the liquid crystal layer 30 with respect to linear polarization in the X-axis direction is relatively high in the regions of the liquid crystal layer 30 facing the second electrodes 16. The refractive index becomes gradually lower in the direction from a region facing a second electrode 16 toward a region facing a first electrode 14. In this manner, a refractive index distribution in the form of a convex lens is formed.

As already described, each of the first electrodes 14 and the second electrodes 16 extends in the Y-axis direction. Accordingly, the refractive index distribution 34 of the liquid crystal layer 30 by applying voltage has the form of a cylindrical lens that extends in the Y-axis direction. The first electrodes 14 and the second electrodes 16 are alternately arranged in the X-axis direction. In the refractive index distribution in the form of a lenticular lens, cylindrical lenses extends in the Y-axis direction and are arranged in the X-axis direction.

In the liquid crystal optical device of the comparative example, the electric force lines 36 are distributed substantially in a symmetrical manner with respect to the centers 41*a* and 41*b* of first electrodes 14, for example. However, the refractive index distribution 34 is not symmetrical about the centers of the first electrodes 14 in the X-axis direction.

The density of the electric force lines 36 or the electric field intensity is high in the vicinities of the first electrodes 14, and becomes lower in the direction from a first electrode 14 toward each adjacent second electrode 16 or the opposing electrode 24. Therefore, the force to rotate the liquid crystal molecules 32 is strong in the vicinities of the first electrodes 14. The electric force lines 36 spread radially in the vicinities of the first electrodes 14. Therefore, the electric force lines 36 in the two first electrodes 14 serving as the edges of one lens are tilted in the opposite directions, with the plane 42 being the boundary. The region in the vicinity of one of the two first electrodes 14 serving as the lens edges, or the region on the left side of the plane 42 in FIG. 4(*a*), for example, is called a forward-direction region. The region in the vicinity of the other one of the two first electrodes 14 serving as the lens edges, or the region on the right side of the plane 42 in FIG. 4(a), for example, is called a reverse-direction region. In that case, the direction of the electric force lines 36 in the forward-direction region is parallel to the pretilt direction of the liquid crystal molecules 32, as shown in FIG. 4(b). On the other hand, the direction of the electric force lines 36 in the reverse-direction region is the reverse of the pretilt direction, as shown in FIG. 4(c).

FIGS. 4(b) and 4(c) are diagrams showing the orientational states of the liquid crystal molecules 32 distributed along the Z-axis direction near the first electrodes 14 in the forward-direction region and the reverse-direction region, respectively. FIGS. 4(b) and 4(c), illustrate the change in orientational states of the liquid crystal with and without the electric force lines 36 closest to the respective corresponding first electrodes 14. In each of FIGS. 4(b) and 4(c), the liquid crystal molecule 32 shown at the top is the liquid crystal molecule 32 close to the opposing electrode 24, and the liquid crystal molecule 32 shown at the bottom is the liquid crystal molecule 32 close to the first electrode 14. In the left half of each of FIGS. 4(b) and 4(c), the direction of the electric force lines 36 is superimposed on the orientational state of the liquid crystal prior to voltage application. The right half of each of FIGS. 4(b) and 4(c) shows the orientational state of the liquid crystal affected by the electric force lines 36.

In the forward-direction region, the tilt direction of the liquid crystal molecule 32 affected by the electric force line 36 in the closest vicinity region on the right side of the center 41a of the first electrode 14 is the same as the tilt direction of the liquid crystal molecule 32 thereabove. That is, in the vicinity of the first electrode 14 in the forward-direction region, the rising direction of the liquid crystal molecule 32 in reorienting motion is the same as the tilt direction of the electric field. In this case, the director in the vicinity region on the right side of the center 41a of the first electrode 14 tilts to the first substrate unit 10, and the horizontal component thereof easily increases. As a result, the refractive index becomes higher in the vicinity of the first substrate unit 10.

Also, in the vicinity of the second substrate unit 20 in the region immediately above the first electrode 14 in the forward-direction region, the liquid crystal molecules 32 rise along the electric force lines extending in the vertical direction (the Z-axis direction). As a result, the horizontal component of the director decreases, and the refractive index becomes lower in the vicinity of the second substrate unit 20. In this manner, the effects in the vicinities of the first and second substrate units compensate each other in the forward-direction region. Accordingly, the decrease in the refractive index in the upper vicinity region on the right side of the center 41a of the first electrode 14 is suppressed.

In the reverse-direction region, on the other hand, the tilt direction of the liquid crystal molecule 32 affected by the electric force line 36 in the closest vicinity region on the left side of the center 41b of the first electrode 14 is the reverse of the tilt direction of the liquid crystal molecule 32 located thereabove. That is, in the vicinity of the first electrode 14 in the reverse-direction region, the rising direction of the liquid crystal molecule 32 in reorienting motion is the reverse of the tilt direction of the electric field. In this case, the rotational torques according to elastic and electric forces compensate each other. Therefore, the liquid crystal molecule in the closest vicinity region on the left side of the center 41b of the first electrode 14 does not easily tilt. In the region on the left side of the center of each first electrode in the entire liquid layer 30, most of the vertical component of the director is maintained.

In the vicinity of the second substrate unit 20 in the region immediately above the first electrode 14 in the reverse-direction region, the liquid crystal molecule 32 rises along the electric force line 36 extending in the vertical direction (the Z-axis direction). As a result, the horizontal component of the director decreases, and the refractive index becomes lower in the vicinity of the second substrate unit 20. Therefore, in the region on the left side of the center 41b, the compensating effects does not appear, and the decrease in the refractive index becomes larger than in the forward-direction region.

As described above, in the structure of the comparative example that contains the second electrode 16 located at the midpoint between the two first electrodes 14 serving as the lens-edge electrodes of one lens, and that does not contain any openings formed in the opposing electrode 24, the variation (the decrease, for example) in the refractive index differs between the forward-direction region and the reverse-direction region. As a result, the peak position of the refractive index does not overlap with the center plane (the plane 42) of the first electrodes 14. In this comparative example, the peak position of the refractive index moves leftward from the plane 42 in FIG. 4(a). Therefore, the refractive index distribution is asymmetrical (with respect to the plane 42).

Figure 5:
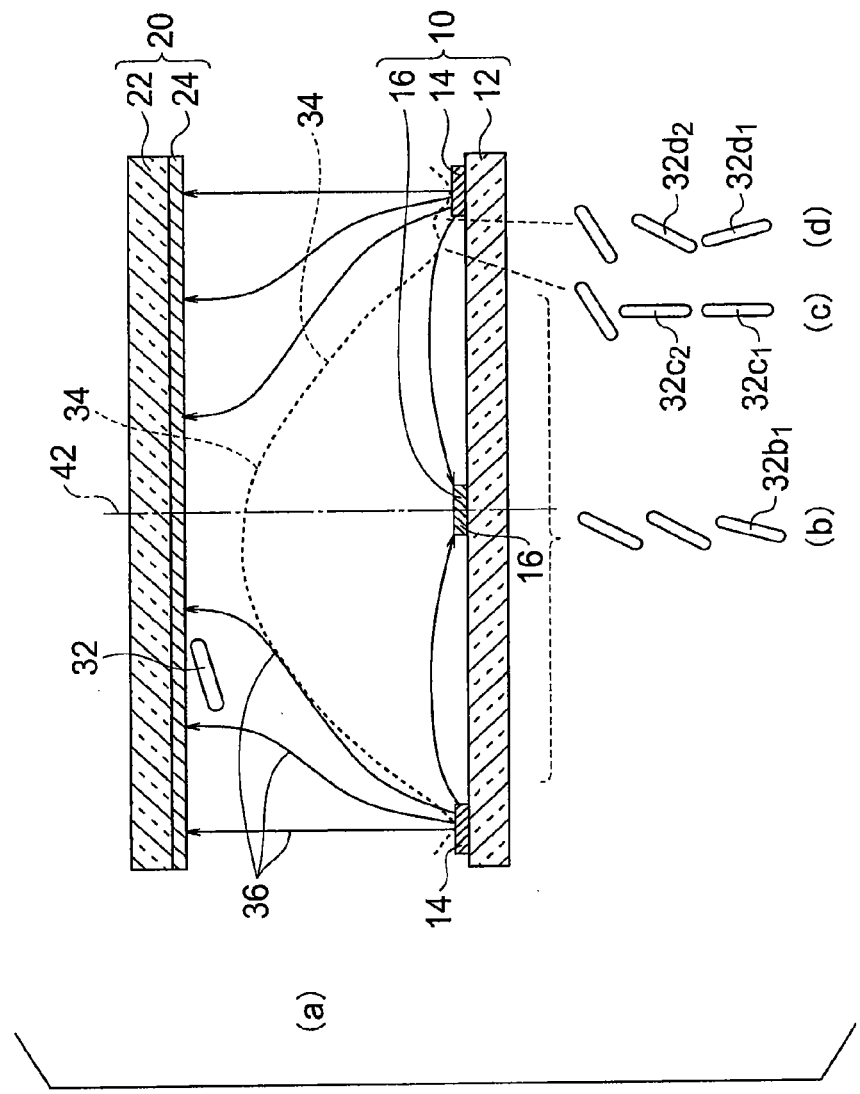
FIGS. 5(a) through 5(d) are diagrams showing the comparative example of a liquid crystal optical device.

FIGS. 5(a), 5(b), 5(c), and 5(d) illustrate a state where a higher voltage than in the case illustrated in FIG. 4(a) is applied to the liquid crystal optical device of the comparative example. FIG. 5(a) is a cross-sectional view of the liquid crystal optical device of the comparative example. FIGS. 5(b), 5(c), and 5(d) are diagrams showing the orientational states of liquid crystal molecules 32 in the vicinity of a second electrode 16 (a lens-center electrode) and in the two vicinity positions of a first electrode (a lens-edge electrode) 14 in the liquid crystal optical device of the comparative example. FIG. 5(a) does not show the first alignment layer 18 and the second alignment layer 26 shown in FIG. 1. Here, a high voltage means a voltage with which the refractive index starts dropping or the optical properties of the element are degraded as will be described later.

In the reverse-direction region, which is the region on the right side of the plane 42 in FIG. 5(a), the electric field tilted in a direction that is the reverse of the tilt direction of the liquid crystal molecules becomes stronger. As indicated by the liquid crystal molecule $32d_1$ at the bottom in FIG. 5(d), the liquid crystal molecule closest to the first electrode 14 tilts in the same direction as the electric field. Therefore, a bend (an arch-like bent) distortion is formed in orientation between the liquid crystal molecule $32d_1$ and the liquid crystal molecule $32d_2$ located immediately thereabove. In the region that spreads across the plane 42 from the forward-direction region, the liquid crystal molecule $32b_1$ closest to the first surface tilts in the same direction as pretilt, as shown in FIG. 5(b). In the boundary region between the two regions, the liquid crystal molecule $32c_1$ closest to the first surface and the liquid crystal molecule $32c_2$ located immediately thereabove orient perpendicularly, as shown in FIG. 5(c), and the refractive index in this position is lower than that in the surrounding regions. As a result, a step-like refractive index distribution 34 is formed, and the refractive index distribution 34 becomes more asymmetrical with respect to the plane 42.

Figure 6:
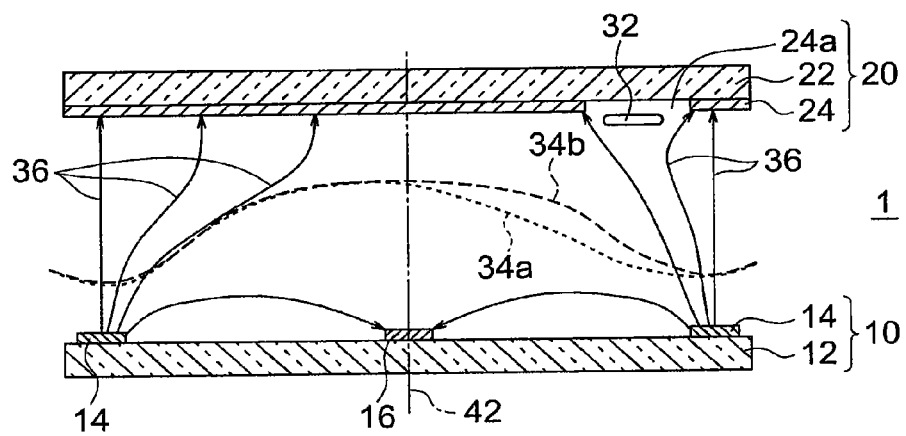
FIG. 6 is a cross-sectional view showing a refractive index distribution of the liquid crystal optical device according to the first embodiment.
Figure 7:
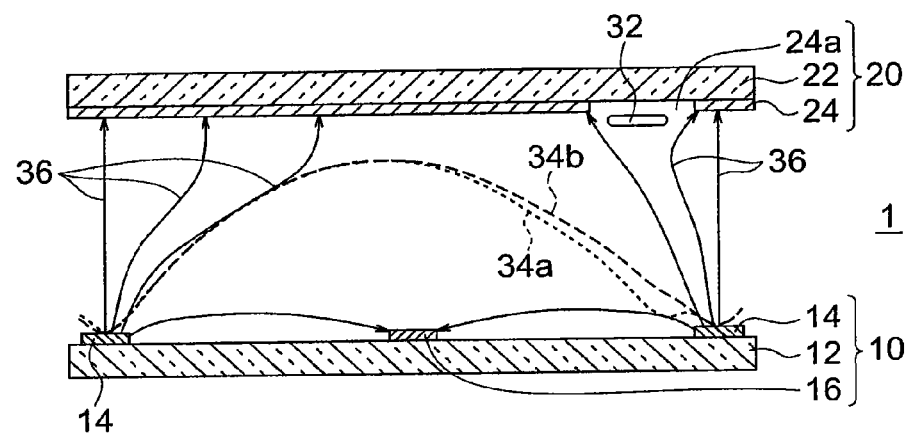
FIG. 7 is a cross-sectional view showing a refractive index distribution of the liquid crystal optical device according to the first embodiment.

FIG. 6 shows the states of liquid crystal molecules and refractive index distributions in the liquid crystal optical device 1 in the first embodiment, when applying the same voltage as in the case illustrated in FIG. 4(a). FIG. 7 shows the states in a case where the same voltage (a high voltage) as in the case illustrated in FIG. 5(a). FIGS. 6 and 7 do not show the first alignment layer and the second alignment layer shown in FIG. 1.

As shown in FIGS. 6 and 7, in the liquid crystal optical device 1 according to the first embodiment, an opening 24a is formed in the opposing electrode 24 in the reverse-direction region. In the opening 24a, the potential varies in the direction from the opening edge toward the opening center, and therefore, the horizontal component of the electric field locally increases. A liquid crystal molecule 32 horizontally-aligned in the vicinity of the opening 24a is restricted from rotating in the vertical direction. Therefore, the decrease in the refractive index in the vicinity of the opening 24a is smaller than that in a case where no openings 24a are formed. Meanwhile, the forward-direction region that is far from the opening 24a is hardly affected by the opening 24a, and the decrease in the refractive index at the time of voltage application (in an active state) is almost the same as that in a case where no openings 24a are formed. As a result, the symmetry in the resultant refractive index distribution 34b is improved compared with the refractive index distribution 34a obtained in the case where no opening 24a are formed.

Figure 8:
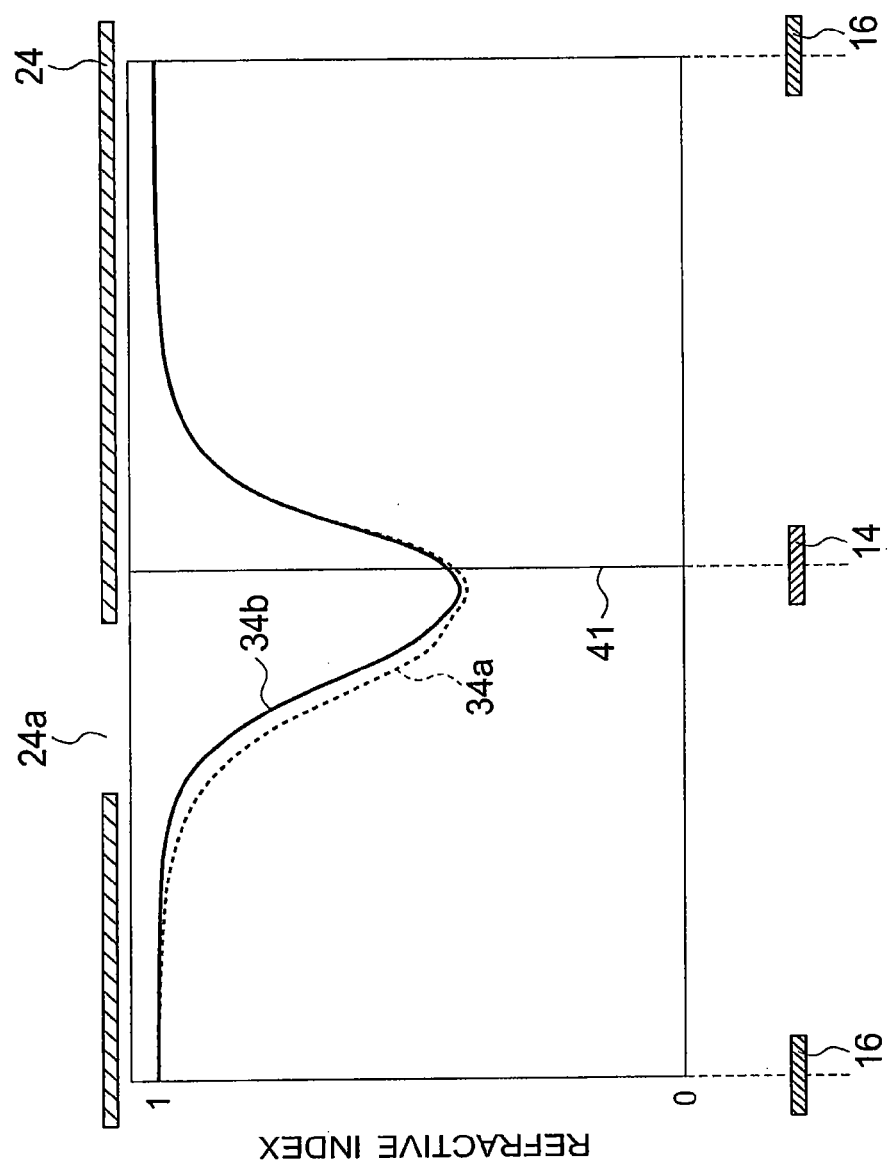
FIG. 8 is a diagram showing the characteristics of liquid crystal optical devices.

FIG. 8 shows the refractive index distributions of the liquid crystal optical devices 1 according to the comparative example and the first embodiment. The dashed line is the refractive index distribution 34a of the comparative example in the case illustrated in FIG. 4(a), and the solid line is the refractive index distribution 34b in the liquid crystal optical device 1 of the first embodiment shown in FIG. 6(a). The abscissa axis indicates position in the X-axis direction, and the ordinate axis indicates refractive index of the liquid crystal layer 30 normalized by the refractive index when voltage is not applied to the liquid crystal optical device 1. With the center of a lens-edge electrode 14 being a plane 41, the zone between the centers of the adjacent lens-center electrodes 16 is shown.

In the refractive index distribution 34a of the comparative example, the refractive index slowly becomes lower in the direction from the lens-center electrode 16 on the left side toward the plane 41. In the region between the plane 41 and the lens-center electrode 16 on the right side, a decrease in the refractive index is prevented. In the region between the plane 41 and the lens-center electrode 16 on the right side, the refractive index varies rapidly.

In the refractive index distribution 34b of the liquid crystal optical device 1 according to the first embodiment, on the other hand, the gradient of the decrease in the refractive index in the region between the lens-center electrode 16 on the left side and the plane 41 is higher than that of the comparative example. That is, the symmetry in the refractive index distribution 34b of the first embodiment is compared with the refractive index distribution 34a of the comparative example.

In the first embodiment, the openings 24a are formed only in the reverse-direction regions of the opposing electrode 24, to improve the symmetry in the refractive index distribution.

The factors of the symmetry in the refractive index distribution include not only the differences in the peak positions of the refractive index distribution but also the differences in the bottom positions. The differences are not necessarily the same in size. As can be seen from FIG. 8, the differences are smaller in the first embodiment than those in the comparative example. The remaining differences may be adjusted, for example, by controlling the shift in position between the pixel groups of the image display unit and the liquid crystal optical device 1 when they are stacked, to compensate the differences.

Figure 9:
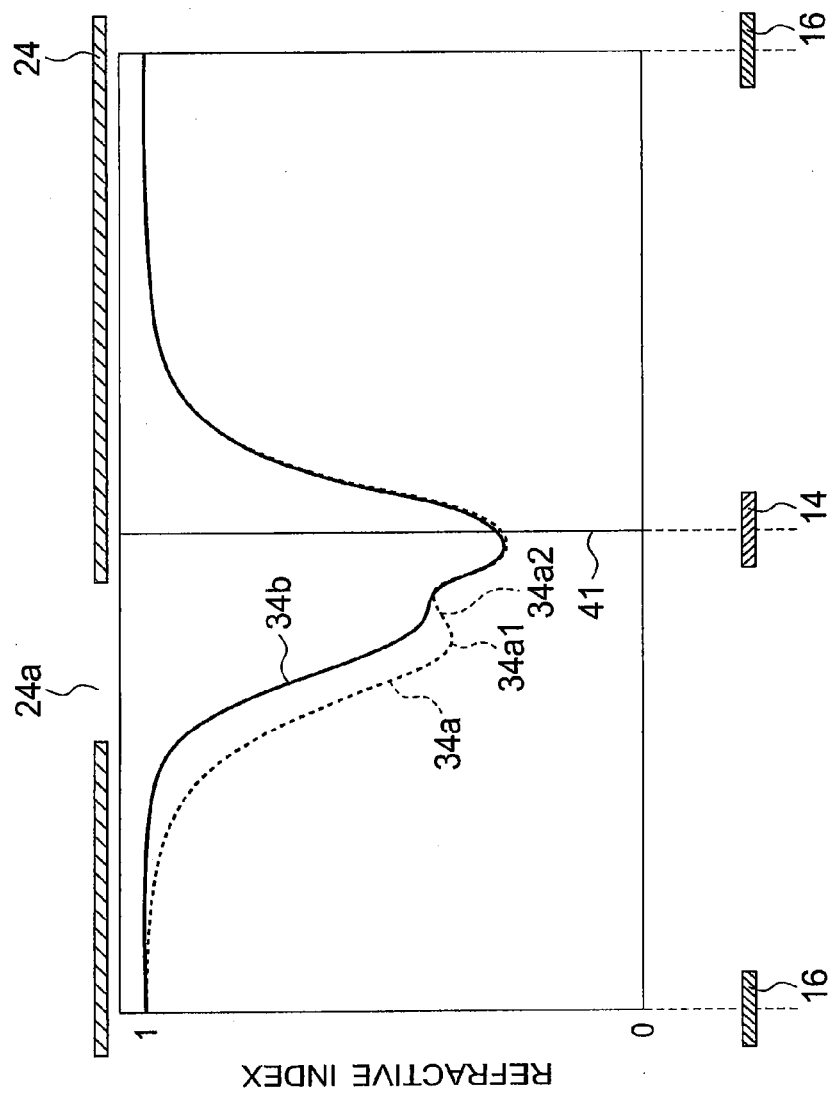
FIG. 9 is a diagram showing the characteristics of liquid crystal optical devices.

FIG. 9 shows the refractive index distributions of the liquid crystal optical devices 1 according to the comparative example and the first embodiment in case where a high voltage is applied. The dashed line is the refractive index distribution 34a of the comparative example in the case illustrated in FIG. 5(a), and the solid line is the refractive index distribution 34b in the liquid crystal optical device 1 of the first embodiment shown in FIG. 7(a). The abscissa axis indicates position in the X-axis direction, and the ordinate axis indicates refractive index of the liquid crystal layer 30 normalized by the refractive index when voltage is not applied to the liquid crystal optical device 1. With the center of a lens-edge electrode 14 being a plane 41, the zone between the centers of the adjacent lens-center electrodes 16 is shown.

In the refractive index distribution 34a of the comparative example, the refractive index slowly becomes lower in the direction from the lens-center electrode 16 on the left side toward the plane 41. Furthermore, the refractive index has a step-like distribution on the left side of the plane 41. Particularly, on the left side of a step-like sub peak portion 34a1, a zone 34a2 having a tilt direction that is the reverse of the tilt direction in the surrounding regions appears, and light that passes through this zone 34a2 travels in a direction that is the reverse of the traveling direction in the surrounding regions. As a result, the light turns into stray light that degrades lens performance.

In the refractive index distribution 34b of the liquid crystal optical device 1 according to the first embodiment, on the other hand, the gradient of the decrease in the refractive index in the region between the lens-center electrode 16 on the left side and the plane 41 is higher than that of the comparative example. That is, the symmetry in the refractive index distribution 34b of the first embodiment is improved as compared with the refractive index distribution 34a of the comparative example. Furthermore, there are no zones tilted in a direction that is the reverse of the tilt direction in the surrounding regions in a step-like distribution unlike that of the comparative example, and the step-like portion is a short horizontal zone. Accordingly, appearance of stray light is prevented.

In the first embodiment, the openings 24a are formed in the reverse-direction regions in the opposing electrode 24. Accordingly, the symmetry in the refractive index distribution is improved, and appearance of stray light can be effectively prevented.

Figure 10:
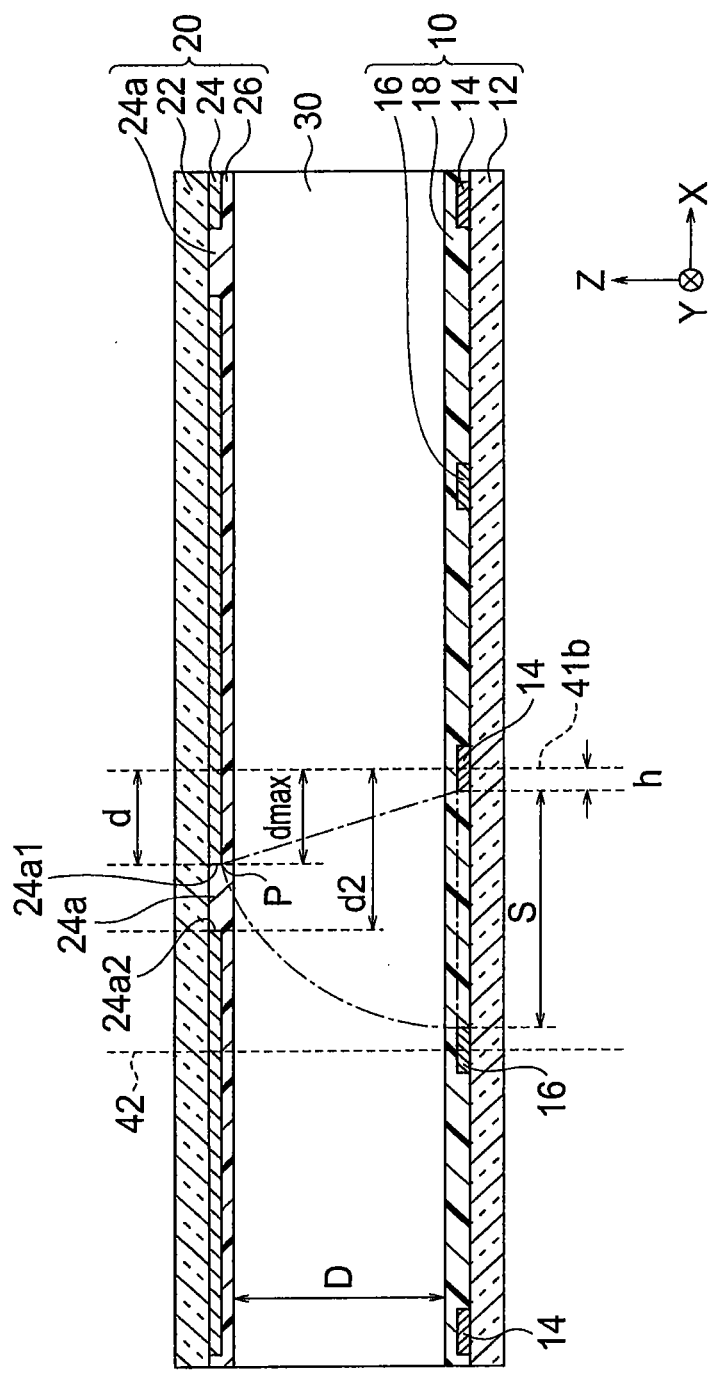
FIG. 10 is a cross-sectional view showing the settings and the design of the openings.

FIG. 10 is a cross-sectional view of the liquid crystal optical device 1 for explaining the settings and the design of the openings 24a. In the description below, the drive conditions are such that a predetermined voltage is applied to the lens-edge electrodes 14, and the lens-center electrodes 16 and the opposing electrode 24 are grounded.

When the openings 24a are projected onto the first substrate 12, it is preferable that the projection regions do not overlap with the regions covered with the lens-edge electrodes 14. Specifically, the distance d in the X-axis direction between the end portion 24a1 of an opening 24a closer to a lens-edge electrode 14 and the plane 41b of the lens-edge electrode 14 closest to the opening 24a is equal to or longer than the half width h of the width of the lens-edge electrode 14 in the X-axis direction. If the distance d is shorter than that, the width of the zone in which the vertical electric field is strong becomes shorter in the vicinity of the lens-edge electrode 14, which suppresses of the reorientation of the liquid crystal molecules, and therefore the amount of modulation in the refractive index decreases. As a result, the refractive power of the liquid crystal optical device 1 becomes weaker.

The intensity of a leakage field that appears near the opening 24a under the predetermined drive conditions depends on the horizontal distance d between the end portion 24a1 of the opening 24a and the closest lens-edge electrode 14. That is, the intensity of the electric field that acts on the liquid crystal layer 30 near the end portions of the opening 24a is higher at the end portion 24a1 on the side of the lens-edge electrode 14 than at the end portion 24a2 on the side of the lens-center electrode 16. Therefore, the effect to adjust the refractive index distributions through control of the orientation of liquid crystal molecules is also greater at the end portion 24a1 on the side of the lens-edge electrode 14 than at the end portion 24a2 on the side of the lens-center electrode 16. The above effect is smaller at a longer distance from the closest lens-edge electrode 14 to the opening 24a or at a longer horizontal distance d. The above effect is preferably at least at the same level as the effect to control the orientation of the liquid crystal molecules in the vicinity of the closest lens-center electrode 16 on the first substrate 12. This condition is generally satisfied, as long as the distance between the opening end 24a1 on the side of the lens-edge electrode 14 and the end portion of the closest lens-edge electrode 14 closer to the opening 24a is equal to or smaller than the distance S between the lens-edge electrode 14 and the lens-center electrode 16. P represents the intersection point of a circular arc with the opposing electrode 24. The circular arc has a radius S and is drawn toward the opposing substrate 22, with the center point being the end portion of the lens-edge electrode 14 closer to the opening 24a. The distance in the X-axis direction between the plane 41b of the lens-edge electrode 14 and the point P is represented by dmax. The distance d indicating the position of the end portion 24a1 of the opening 24a on the side of the lens-edge electrode 14 is preferably equal to or shorter than dmax. Specifically, the first electrode 14 closest to the first plane 42 has a first end portion on the side of the first plane 42, and a circular arc is drawn, with the center thereof being the first end portion of the first electrode 14. The distance S in the second direction between the center of the circular arc and the second electrode 16 closest to the first end portion of the first electrode 14 is the radius of the circular arc. Here, the distance dmax in the second direction between the intersection point P of the circular arc with the opposing electrode 24 and the center of the first electrode 14 closest to the first plane 42 is equal to or longer than the distance d in the second direction between the end portion of the opening 24a furthest from the first plane 42 and the center of the first electrode 14 closest to the first plane 42, with the end portion of the furthest opening 24a being on the side of the first electrode 14 closest to the first plane 42. If the distance d is longer than dmax, the leakage field intensity in the vicinity of the opening 24a becomes lower, and the amount of modulation in the refractive index decreases. As a result, the refractive power of the liquid crystal optical device 1 becomes weaker.

The distance in the X-axis direction between the end portion 24a2 of the opening 24a further from the lens-edge electrode 14 and the plane 41b of the lens-edge electrode 14 is represented by d2. The distance d2 is longer than the distance d, but is not longer than S. If the distance d2 is longer than S, the projection region in which the opening 24a is projected onto the first substrate 12 overlaps with the lens-center electrode 16. That is, the opposing electrode 24 cannot completely cover the lens-center electrode 16, resulting in degradation of the controllability on the refractive index distribution at the lens center portion.

As described above, the first embodiment can provide a liquid crystal optical device having excellent optical properties, an image display device, and an imaging device.

(Second Embodiment)

Figure 11:
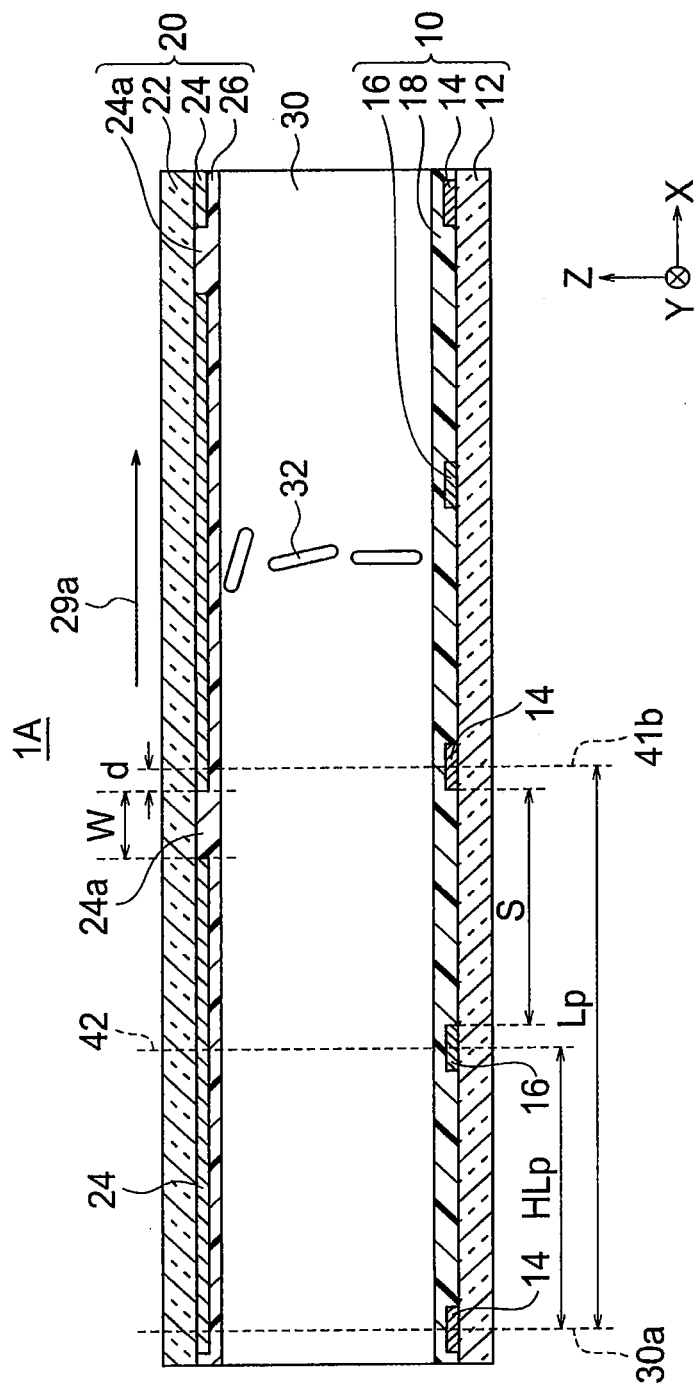
FIG. 11 is a cross-sectional view of a liquid crystal optical device according to a second embodiment.

FIG. 11 is a cross-sectional view of a liquid crystal optical device 1A according to a second embodiment. The liquid crystal optical device 1A of the second embodiment has the same structure as the liquid crystal optical device 1 of the first embodiment, except that the orientation processing direction of the second alignment layer 26 is the reverse of that in the liquid crystal optical device 1 shown in FIG. 1. The orientation processing direction of the second alignment layer 26 in the liquid crystal optical device 1A of the second embodiment is the positive direction of the X-axis, as indicated by an arrow 29a in FIG. 11.

Figure 12:
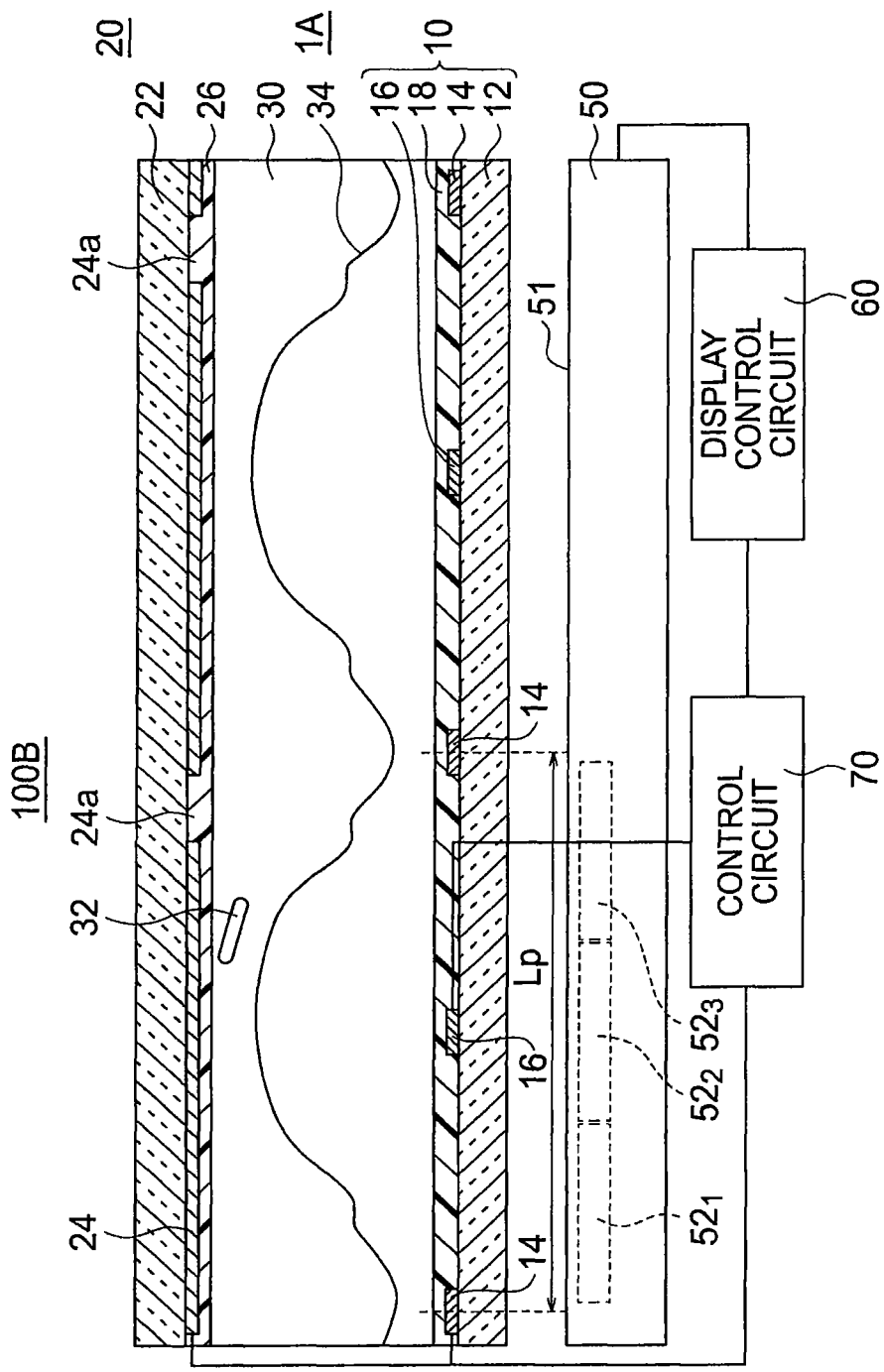
FIG. 12 is a diagram showing a specific example of an image display device using the liquid crystal optical device according to the second embodiment.

FIG. 12 shows a specific example of an image device using the liquid crystal optical device 1A of the second embodiment. The image device of this specific example is an image display device 100B. The image display device 100B differs from the image display device 100 shown in FIG. 2 in that the liquid crystal optical device 1 is replaced with the liquid crystal optical device 1A of the second embodiment. As in the first embodiment, the liquid crystal optical device 1A can also be used in an imaging device in the second embodiment.

In the liquid crystal optical device 1A of the second embodiment, the amount of optical modulation is larger than that in the liquid crystal optical device 1 of the first embodiment shown in FIG. 1. This aspect will be described below.

FIG. 12 also shows the refractive index distribution 34 in a state where the voltage applied to the first electrodes 14 is higher than that in the first embodiment shown in FIG. 1. The voltage is applied so that a stationary zone (a shoulder) appears in the refractive index distribution 34 in the region (the reverse-direction region or the second region) on the right side of the center of a lens in the liquid crystal optical device 1 of the first embodiment.

In the liquid crystal optical device 1A of the second embodiment, on the other hand, another stationary zone appears in the other region, as shown in FIG. 12. In the liquid crystal optical device 1A of the second embodiment, the positions of the first region and the second region located on the right and left sides of the center of a lens are the reverse of the positions in the liquid crystal optical device 1 of the first embodiment. The bend orientation distortion appears in a short zone in the vicinity of the first electrode 14 only in the region (the reverse-direction region) on the left side of the center of a lens, and a corresponding stationary zone is intrinsically formed in the refractive index distribution 34 on the boundary with the region uniformly tilted on the left side of the center of the lens in FIG. 12. In the second embodiment, in the region (the forward-direction region) on the right side of the center of a lens, an opening 24a is formed in a position in the opposing electrode 24, with the position being substantially symmetrical to the horizontal position of the stationary point of the refractive index in the left-side region (the reverse-direction region). In the opening 24a, the potential becomes lower in the direction from the edge of the opening 24a toward the center of the opening 24a, and therefore, the horizontal component of the electric field locally increases. A liquid crystal molecules with horizontal-orientation in the vicinity of the opening 24a is restricted from rotating to vertical orientation. Therefore, the stationary zones are also formed in the refractive index distribution 34 on the right side of the center of the lens in FIG. 12. The stationary zones cause the refractive index to be increased with a similar effect in a Fresnel lens. As a result, the symmetry in the refractive index distribution 34 are improved, and the amount of modulation of the refractive index becomes larger than that in the liquid crystal optical device 1 of the first embodiment shown in FIG. 1.

Like the first embodiment, the second embodiment can provide a liquid crystal optical device having excellent optical properties, an image display device, and an imaging device.

The number N and the number M of openings in the opposing electrode 24 can be arbitrarily set in accordance with the rubbing direction of the first alignment layer 18, the voltages to be applied to the electrodes, the type of the liquid crystal material used in the liquid crystal layer 30, and the thickness of the liquid crystal layer 30. So as to improve the symmetry of a GRIN lens formed with a second electrode 16 at its center, an additional number of openings can be located in the right or left side of the second electrode in the opposing electrode 24.

Although each liquid crystal optical device is used in an image display device or an imaging device in the above described first and second embodiments, a liquid crystal optical device may be used at least in one of the image display device and the imaging device of a personal digital assistant.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A liquid crystal optical device comprising:
a first substrate unit including: a first substrate having a first surface parallel to a first direction and a second direction perpendicular to the first direction; a plurality of first electrodes formed on the first surface, the first electrodes extending in the first direction and being arranged in the second direction; a plurality of second electrodes, each of the second electrodes being formed between two adjacent first electrodes of the first electrodes on the first surface, the second electrodes extending in the first direction and being arranged in the second direction; and a first alignment layer, the first electrodes and the second electrodes being between the first alignment layer and the first substrate;
a second substrate unit including: a second substrate having a second surface facing the first surface; an opposing electrode formed between the second surface and the first substrate unit; and a second alignment layer, the opposing electrode being between the second alignment layer and the second substrate; and
a liquid crystal layer interposed between the first substrate unit and the second substrate unit, the liquid crystal layer containing liquid crystal molecules,
wherein
the liquid crystal molecules on a side of the first alignment layer is aligned perpendicularly to the first surface while the liquid crystal molecules on a side of the second alignment layer are aligned horizontally along the second direction,
the opposing electrode includes:
a first region located between a first plane and a second plane, the first plane extending along a center of a width of one of the second electrodes in the second direction, a center line being parallel to the first direction, the first plane being perpendicular to the second direction, the second plane extending along a center line of one of the first electrodes adjacent to the second electrode, the second plane being perpendicular to the second direction; and
a second region located between the first plane and a third plane extending along the center line of the other one of the first electrodes adjacent to the second electrode, the third plane being perpendicular to the second direction, and
the first region has N first openings, and the second region includes M second openings, N being an integer of 0 or greater, M being an integer of 1 or greater, M being greater than N,
wherein a region on which the opening furthest from the first plane among the second openings is projected does not overlap with the first electrodes.

2. The device according to claim 1, wherein the first openings and the second openings extend in the first direction and are arranged in the second direction.

3. The device according to claim 1, wherein the center of each of the second electrodes in the second direction is a midpoint between the centers of the two first electrodes adjacent to the second electrode.

4. The device according to claim 1, wherein a distance between the third plane and an end portion of the opening furthest from the first plane among the second openings is equal to or longer than a half of a width of a first electrode in the second direction, the end portion of the furthest opening being closest to the first plane, the third plane extending in the first electrode.

5. The device according to claim 1, wherein a width in the second direction of the opening furthest from the first plane among the second openings is equal to or smaller than a distance in the second direction between the first electrode having the third plane extending therein and the second electrode having the first plane extending therein.

6. The device according to claim 1, wherein when a circular arc having a center being a first end portion on a side of the first plane and having a radius equal to a distance in the second direction between the center of the circular arc and the second electrode closest to the first end portion of the first electrode closest to the first plane is drawn, a distance in the second direction between an intersection point of the circular arc with the opposing electrode and the center of the first electrode closest to the first plane is equal to or longer than a distance in the second direction between an end portion of the opening furthest from the first plane and the center of the first electrode closest to the first plane, the end portion of the furthest opening being on a side of the first electrode closest to the first plane.

7. The device according to claim 1, wherein M equals 1 and N equals 0.

8. An image display device comprising:
a liquid crystal optical device comprising:
a first substrate unit including: a first substrate having a first surface parallel to a first direction and a second direction perpendicular to the first direction; a plurality of first electrodes formed on the first surface, the first electrodes extending in the first direction and being arranged in the second direction; a plurality of second electrodes, each of the second electrodes being formed between two adjacent first electrodes of the first electrodes on the first surface, the second electrodes extending in the first direction and being arranged in the second direction; and a first alignment layer, the first electrodes and the second electrodes being between the first alignment layer and the first substrate;

a second substrate unite including: a second substrate having a second surface facing the first surface; and opposing electrode formed between the second surface and the first substrate unit; and a second alignment layer, the opposing electrode being between the second alignment layer and the second substrate; and a liquid crystal layer interposed between the first substrate unit and the second substrate unit, the liquid crystal layer containing liquid crystal molecules, wherein the liquid crystal molecules on a side of the first alignment layer being aligned perpendicularly to the first surface while the liquid crystal molecules on a side of the second alignment layer are aligned horizontally along the second direction, the opposing electrode includes:
  a first region located between a first plane and a second plane, the first plane extending along a center of a width of one of the second electrodes in the second direction, a center line being parallel to the first direction, the first plane being perpendicular to the second direction, the second plane extending along a center line of one of the first electrodes adjacent to the second electrode, the second plane being perpendicular to the second direction; and
  a second region located between the first plane and a third plane extending along the center line of the other one of the first electrodes adjacent to the second electrode, the third plane being perpendicular to the second direction, and
  the first region has N first openings, and the second region includes M second openings, N being an integer of 0 or greater, M being an integer 1 or greater, M being greater than N;

an image display unit having an image display surface, the image display unit being positioned to face the liquid crystal optical device;

a first control unit configured to control the image display unit based on a video signal input from outside, and cause the image display unit to display an image in accordance with the video signal; and a second control unit configured to drive and control the liquid crystal optical device by applying a voltage to the first and second electrodes and the opposing electrode of the liquid crystal optical device based on a signal from the first control unit, the second control unit being capable of controlling light emitted from the image display unit, wherein a region on which the opening furthest from the first plane among the second openings is projected does not overlap with the first electrodes.

9. The device according to claim 8, wherein the first openings and the second openings extend in the first direction and are arranged in the second direction.

10. The device according to claim 8, wherein the center of each of the second electrodes in the second direction is a midpoint between the centers of the two first electrodes adjacent to the second electrode.

11. The device according to claim 8, wherein a distance between the third plane and an end portion of the opening furthest from the first plane among the second openings is equal to or longer than a half of a width of a first electrode in the second direction, the end portion of the furthest opening being closest to the first plane, the third plane extending in the first electrode.

12. The device according to claim 8, wherein a width in the second direction of the opening furthest from the first plane among the second openings is equal to or smaller than a distance in the second direction between the first electrode having the third plane extending therein and the second electrode having the first plane extending therein.

13. The device according to claim 8, wherein, when a circular arc having a radius equal to a distance in the second direction between the center of the circular arc and the second electrode closest to a first end portion of the first electrode closest to the first plane is drawn, with the center of the circular arc being the first end portion on a side of the first plane, a distance in the second direction between an intersection point of the circular arc with the opposing electrode and the center of the first electrode closest to the first plane is equal to or longer than a distance in the second direction between an end portion of the opening furthest from the first plane and the center of the first electrode closest to the first plane, the end portion of the furthest opening being on a side of the first electrode closest to the first plane.

14. The device according to claim 8, wherein M equals 1 and N equals 0.

15. An imaging device comprising:
  a liquid crystal optical device comprising:
    a first substrate unit including: a first substrate having a first surface parallel to a first direction and a second direction perpendicular to the first direction; a plurality of first electrodes formed on the first surface, the first electrodes extending in the first direction and being arranged in the second direction; a plurality of second electrodes, each of the second electrodes being formed between two adjacent first electrodes of the first electrodes on the first surface, the second electrodes extending in the first direction and being arranged in the second direction; and a first alignment layer, the first electrodes and the second electrodes being between the first alignment layer and the first substrate;
    a second substrate unit including: a second substrate having a second surface facing the first surface; an opposing electrode formed between the second surface and the first substrate unit; and a second alignment layer, the opposing electrode being between the second alignment layer and the second substrate; and
    a liquid crystal interposed between the first substrate unit and the second substrate unit, the liquid crystal layer containing liquid crystal molecules,
    wherein the liquid crystal molecules on a side of the first alignment layer being aligned perpendicularly to the first surface while the liquid crystal molecules on a side of the second alignment layer are aligned horizontally along the second direction,
    the opposing electrode includes:
      a first region located between a first plane and a second plane, the first plane extending along a center of a width of one of the second electrodes in the second direction, a center line being parallel to the first direction, the first plane being perpendicular to the second direction, the second plane extending along a center line of one of the first electrodes adjacent to the second electrode, the second plane being perpendicular to the second direction; and a second region located between the first plane and a third plane extending along the center line of the other one of the first electrodes adjacent to the second electrode, the third plane being perpendicular to the second direction, and the first region has N first openings, and the second region includes M second openings, N being an integer of 0 or greater, M being an integer of 1 or greater, M being greater than N;

an imaging unit including a pixel, the imaging unit being positioned to face the liquid crystal optical device, the pixel being configured to convert an optical signal supplied from an object via the liquid crystal optical device into an electric signal;

a first control unit configured to drive and control the imaging unit, and obtain an image of the object from the electric signal; and a second control unit configured to drive and control the liquid crystal optical device by applying a voltage to the first and second electrodes and the opposing electrode of the liquid crystal optical device based on a signal from the first control unit, wherein a region on which the opening furthest from the first plane among the second openings is projected does not overlap with the first electrodes.

16. The device according to claim 15, wherein the first openings and the second openings extend in the first direction and are arranged in the second direction.

17. The device according to claim 15, wherein the center of each of the second electrodes in the second direction is a midpoint between the centers of the two first electrodes adjacent to the second electrode.

18. The device according to claim 15, wherein a distance between the third plane and an end portion of the opening furthest from the first plane among the second openings is equal to or longer than a half of a width of a first electrode in the second direction, the end portion of the furthest opening being closest to the first plane, the third plane extending in the first electrode.

19. The device according to claim 15, wherein a width in the second direction of the opening furthest from the first plane among the second openings is equal to or smaller than a distance in the second direction between the first electrode having the third plane extending therein and the second electrode having the first plane extending therein.

20. The device according to claim 15, wherein, when a circular arc having a radius equal to a distance in the second direction between the center of the circular arc and the second electrode closest to a first end portion of the first electrode closest to the first plane is drawn, with the center of the circular arc being the first end portion on a side of the first plane, a distance in the second direction between an intersection point of the circular arc with the opposing electrode and the center of the first electrode closest to the first plane is equal to or longer than a distance in the second direction between an end portion of the opening furthest from the first plane and the center of the first electrode closest to the first plane, the end portion of the furthest opening being on a side of the first electrode closest to the first plane.

21. The device according to claim 15, wherein M equals 1 and N equals 0.

* * * * *